Sheet 1- 2 Sheets.

M. W. Hill,
Meal Bin,
Nº 49,404. Patented Aug. 15, 1865.

Attest:
Chas. Edw. Foote
James T. Graham

Inventor:
Martin W. Hill

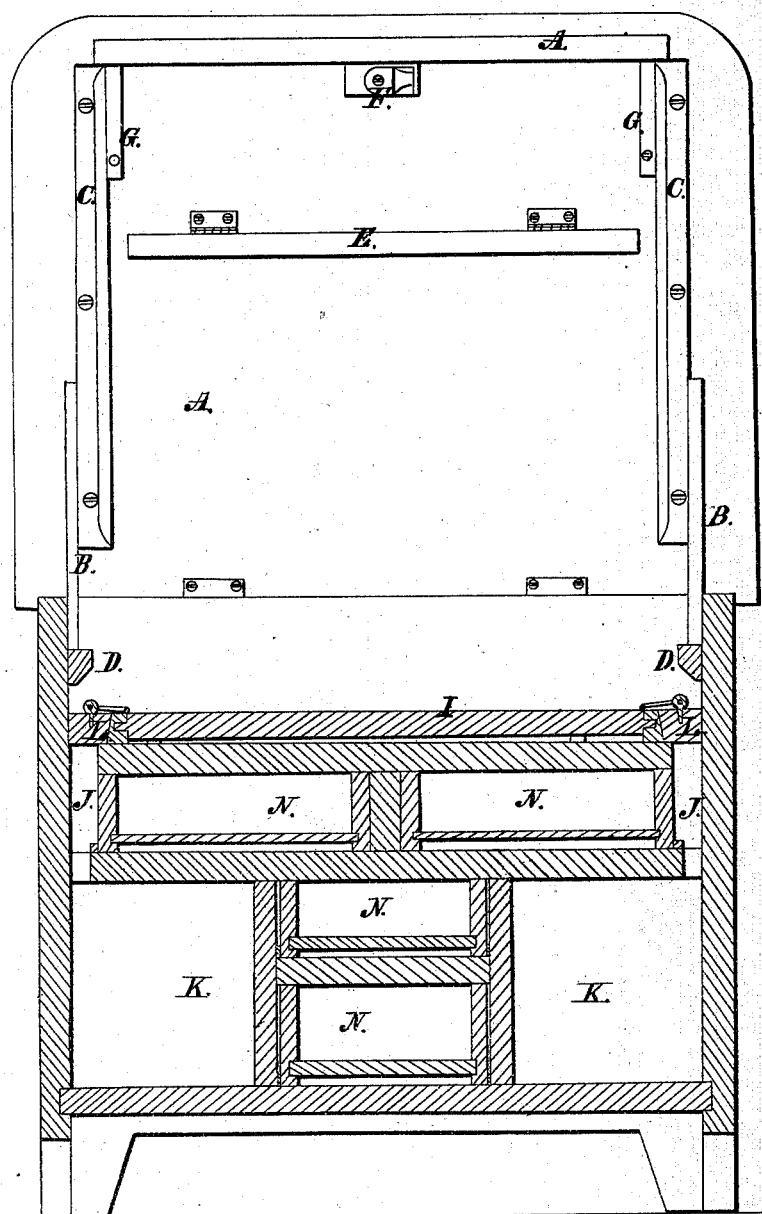

UNITED STATES PATENT OFFICE.

MARTIN W. HILL, OF NEW YORK, N. Y.

IMPROVED FLOUR-CHEST.

Specification forming part of Letters Patent No. 49,404, dated August 15, 1865; antedated August 4, 1865.

*To all whom it may concern:*

Be it known that I, MARTIN W. HILL, of the city, county, and State of New York, have invented a new and useful Home-Baker's Repository; and I do hereby declare that the following is a full and exact description thereof, reference being had to the accompanying drawings, and to letters of reference marked thereon.

The nature of my invention consists, first, in the combination, hereinafter described, of a sliding molding-board, hinged cover, and bins or receptacles for flour; second, in the arrangement, hereinafter described, of the sliding molding-board, trap-doors, or their equivalent, and spouts or openings for conducting the flour to the bins for its reception; third, in the combination, with the folding cover which shelters the molding-board, of a hinged shelf, as hereinafter more fully set forth; fourth, in the combination, hereinafter described, of the flour-bins, the side doors opening thereto, and the inner sliding boards, or their equivalent, whereby the occasional removal of portions of the flour is facilitated, as hereinafter set forth.

Figure 1:
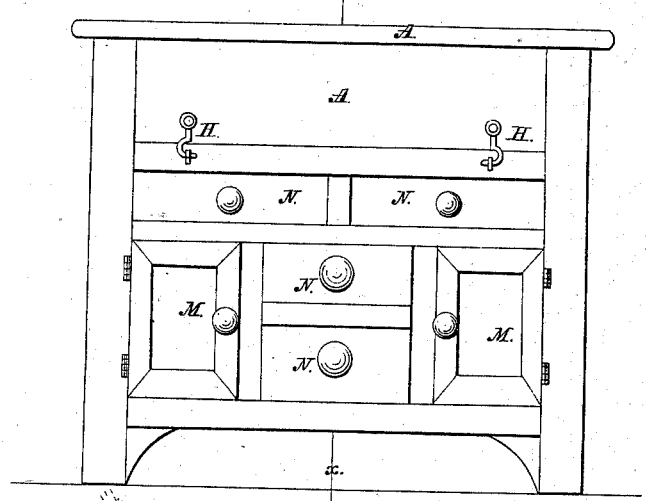
Figure 2:
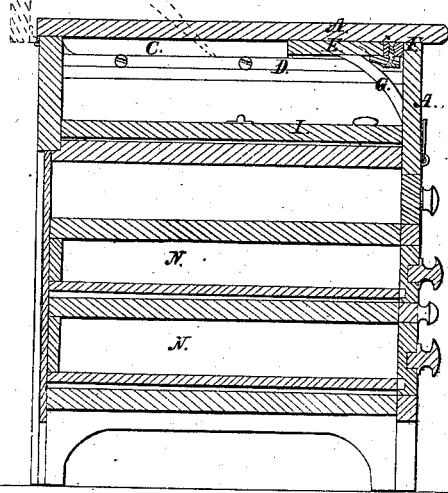

In the drawings, Figure 1 is a front view of the repository when closed. Fig. 2 is a vertical cross-section through the line $xx$, with the lid closed, and showing in red lines the lid open. Fig. 3 is a vertical longitudinal section, with the lid entire and raised.

A is the lid, the front of which, when said lid is raised, becomes a shelf, very convenient for holding various articles when the repository is in use. The lid A, when raised, is held up by sliding braces B pivoted to cross-pieces C fastened to the lid near its ends, and their lower ends, while the lid is being raised, sliding along the cross-pieces D fastened to the inner sides of the ends of the repository near their upper edges.

E is a hinged shelf, hinged to the lid A in such a way that when not required for use it may be folded up against the lid A, where it is held by the button F.

G are braces to give strength to the front of the lid A when used as a shelf.

H are hooks to fasten the lid down.

I is a sliding molding-board, which may be drawn out when required, and thus more space may be obtained.

J are openings or spouts leading from the space above the molding-board to the flour-bins K. L are lids which close these openings. There are two flour-bins, K, one at each end of the repository, which may contain different kinds of flour, or both may contain the same kind. The bins K are filled through the openings or spouts J, and the flour is taken out through the doors M. When the doors M are opened the flour is kept from flowing out by boards sliding in vertical grooves in the door-posts just within the doors. As the flour lowers in the bins these boards may be taken out, one at a time, so as to allow ready access to the flour at all times.

N are drawers, the number, size, and arrangement of which may of course be varied at pleasure; or the space occupied by the two lower drawers may be made into a cupboard, with a door similar to the doors M; or said space may be occupied as another flour-bin, if desired, with an opening or spout leading into it from the back part of the space above the molding-board J.

This invention confers the following advantages:

First, the combination of the hinged shelf with the folding or hinged cover furnishes a temporary shelf, as already stated, on which utensils or things used in the molding process may be placed for the time being, and yet the shelf may be folded up, either to be out of the way entirely when the cover is raised, or to clear a kneading-bowl or other things which may be upon the molding-board when the cover is let down.

Second, the arrangement of the doors or lids L and the flour-passages for discharging the flour into the bins outside of the molding-board allows the latter to have a smooth surface throughout for kneading purposes, and, further, avoids any impediment which doors or openings in the molding-board might involve to its being slid in and out at pleasure.

Third, the combination of the sliding molding-board with the hinged cover and bins for flour gives a compact apparatus, with the molding-board perfectly shelterd when not in use, and yet allows the molding-board to be slid out when used to promote the convenience of the operator.

Fourth, the combination of the side doors and inner boards for retaining the flour obviates the difficulty and inconvenience which has resulted in other articles of this kind from the necessity of taking the flour from the bins through openings in the molding-board, and very much facilitates the occasional removal of portions of the flour from the bins.

Having thus fully described my invention, I claim—

1. The combination of the sliding molding-board I, hinged lid A, and one or more flour bins, K, substantially as and to the effect hereinabove set forth.

2. The arrangement, hereinabove described of the sliding molding-board I, doors or covers L, one or more of them, or their equivalent, and one or more spouts or openings, J, for admitting the flour to the bins, as set forth.

3. The combination of the hinged shelf E with the lid A, substantially as and for the purpose set forth.

4. The combination of one or more flour-bins, K, one or more side doors, M, opening thereto, and inner sliding or movable boards for retaining the flour, said inner boards being so secured as to be each of them capable of ready and complete removal, so as to leave completely open and unobstructed space from the upper remaining board to the top of the opening which the series of said boards is intended to partially close, substantially as and to the effect above set forth.

MARTIN W. HILL.

Witnesses:
HENRY ZEMIER,
JAMES T. GRAHAM.